Aug. 7, 1951        D. H. CLEWELL        2,562,983
FREQUENCY-ADJUSTABLE SEISMIC WAVE DETECTOR
Filed May 27, 1947        3 Sheets-Sheet 1
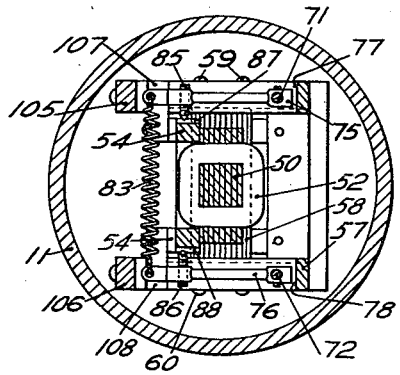
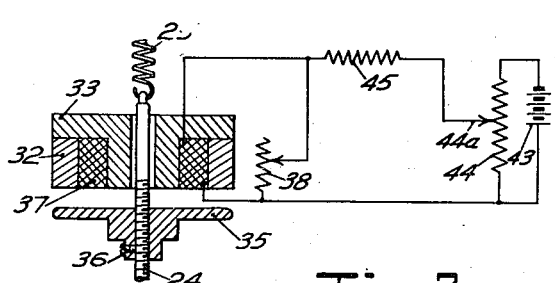
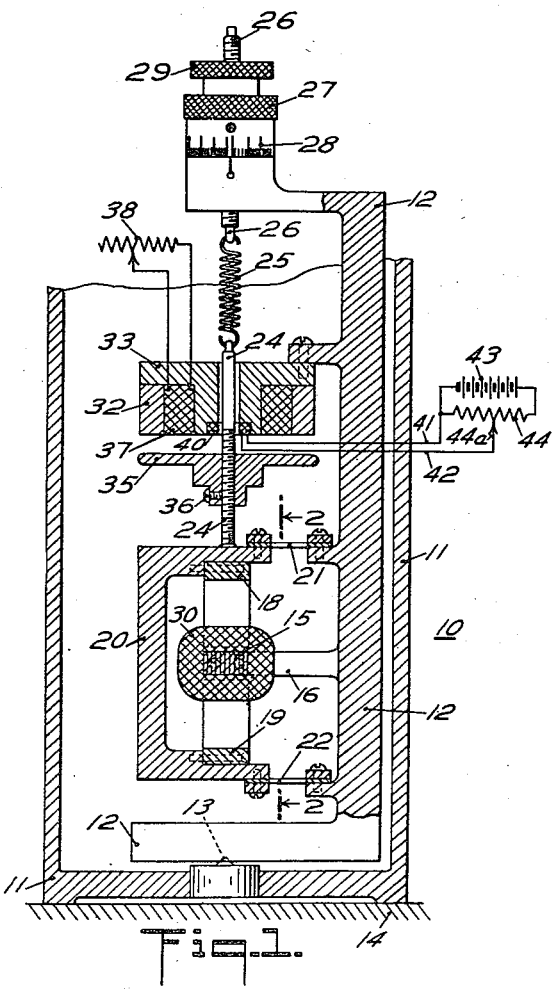
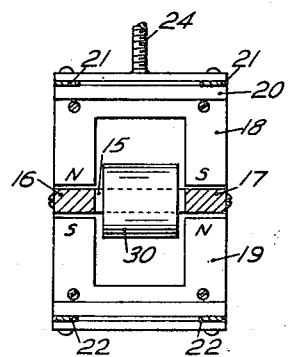
INVENTOR
DAYTON H. CLEWELL
BY
Sidney A. Johnson
ATTORNEY Aug. 7, 1951  D. H. CLEWELL  2,562,983
FREQUENCY-ADJUSTABLE SEISMIC WAVE DETECTOR
Filed May 27, 1947  3 Sheets-Sheet 2
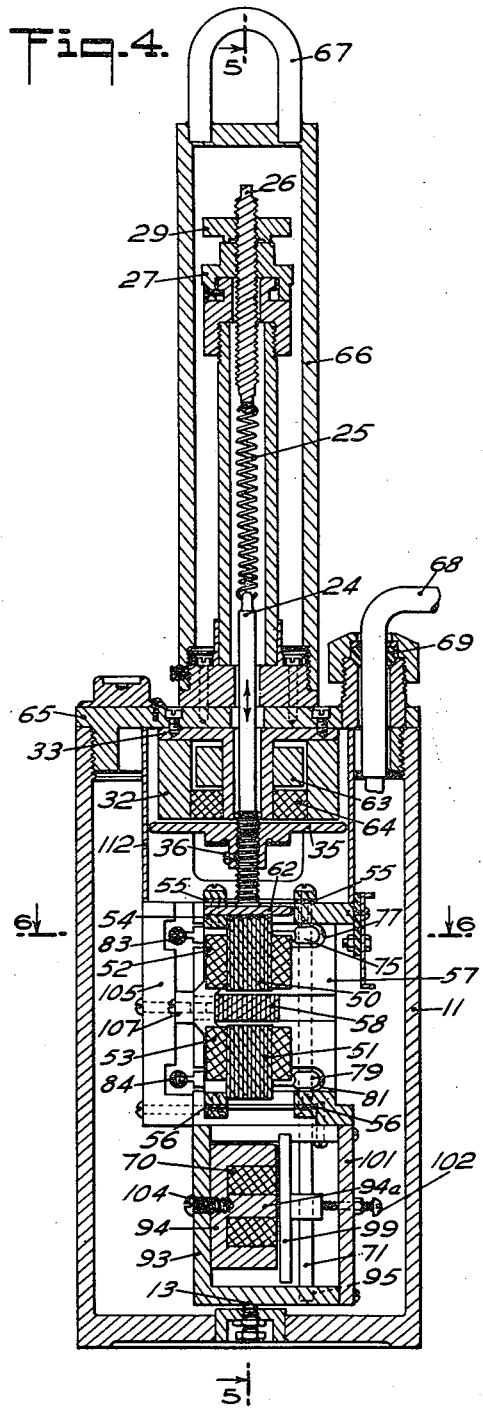
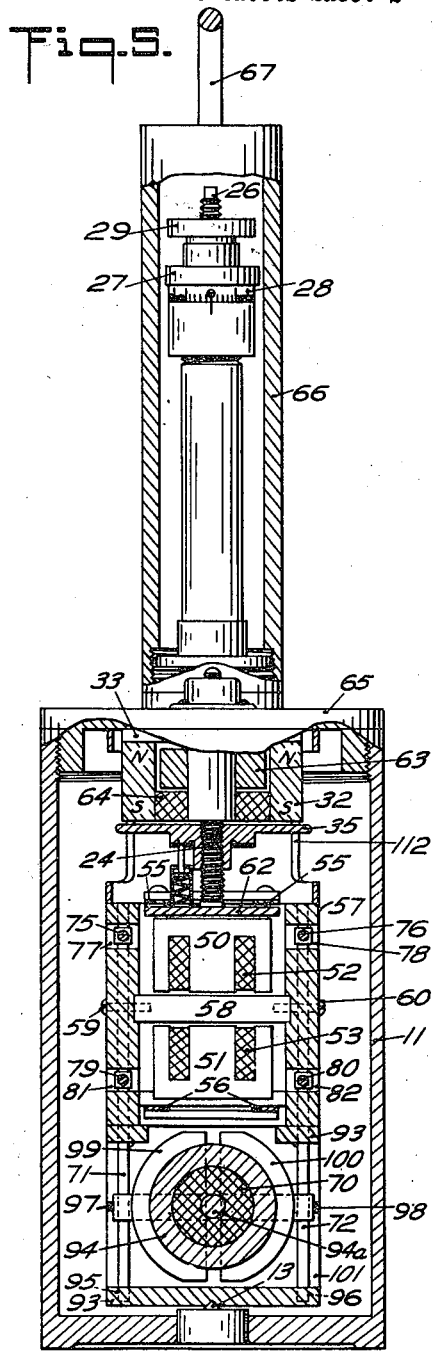
INVENTOR
DAYTON H. CLEWELL
BY
Sidney A. Johnson
ATTORNEY Aug. 7, 1951 D. H. CLEWELL 2,562,983
FREQUENCY-ADJUSTABLE SEISMIC WAVE DETECTOR
Filed May 27, 1947 3 Sheets-Sheet 3

INVENTOR
DAYTON H. CLEWELL
BY
Sidney A. Johnson
ATTORNEY

Patented Aug. 7, 1951

2,562,983

UNITED STATES PATENT OFFICE 2,562,983

FREQUENCY-ADJUSTABLE SEISMIC WAVE DETECTOR

Dayton H. Clewell, Dallas, Tex., assignor, by mesne assignments, to Socony-Vacuum Oil Company, Incorporated, New York, N. Y., a corporation of New York Application May 27, 1947, Serial No. 750,775

7 Claims. (Cl. 177—352)

This invention relates to geophysical prospecting apparatus, more particularly to geophones or other means for detecting seismic waves, and has for an object the provision of a rugged detecting device in which the natural undamped frequency may be adjusted to any desired value without changing the dimensions or adjustment of the leaf springs forming a part of the suspension system.

In geophones or mechanical-electrical transducers of the prior art, it has been customary to suspend an inertia mass from a frame by means of leaf springs. Since a leaf spring is much less stiff to deflections parallel to its small dimension than it is to deflections at right angles thereto, the natural undamped frequency of the suspension system may be reduced by decreasing the smaller dimension with respect to the dimension at right angles thereto. It is, of course, understood that for the purpose of maintaining high stability and ruggedness to deflections perpendicular to the normal mode of vibration, it is not desirable to reduce the width of the leaf spring in order to reduce the normal frequency of vibration. There is a limit to how small the ratio of the stiffnesses can be made due to the fact that any mechanical shocks may permanently deform the leaf springs and throw the geophone out of adjustment.

More particularly, in refraction surveys, where the geophones may be located a great distance, a mile or more, from the shotpoint, the refracted waves may be of relatively low frequency. For such applications the refraction geophone should have a natural undamped frequency of the order of two per second. If conventional leaf springs are utilized to provide such a low order of undamped frequency in a vertical direction, conventional leaf springs must be so thin that slight mechanical shocks deflect the inertia mass in horizontal directions and to a degree which permanently deforms the leaf springs.

In accordance with the present invention, the leaf springs may be dimensioned to provide adequate strength and yet the geophone as a whole may have an undamped frequency of the order of two per second or less, by reason of the provision of means for introduction into the suspension system of negative stiffness or negative compliance. In carrying out the invention in one form thereof, the negative stiffness or negative compliance is introduced into the suspension system by applying magnetic forces which act in a vertical and weight-supporting direction on the suspension system. For example, a permanent magnet is mounted on one element of the system while an armature is mounted on the other, the relatively movable element of the system. The attractive force between the magnet and the armature acting in a weight-supporting direction reduces the undamped frequency of the suspension system by an amount related to the magnitude of the magnetic attractive force.

By disposing a coil in inductive relation with the magnetic flux, which changes as a result of vertical vibration of the system, controllable damping may be provided. By changing the value of a resistance connected in closed series-circuit relation with the coil, critical damping of the geophone may be readily attained.

By controlling the direct-current energization of the coil, or of a separate coil, the position or initial setting of the inertia mass with respect to the frame may be readily accomplished.

For a more detailed description of the invention and for further objects and advantages thereof, reference may be had to the accompanying drawings, in which:

Fig. 1 is a sectional view of a geophone embodying the invention;

Fig. 2 is a fractional sectional view taken on the line 2—2 of Fig. 1;

Fig. 3 is a fractional sectional elevation of a modified form of a part of the geophone of Figs. 1 and 2;

Fig. 4 is a sectional elevation of a modified form of a geophone;

Fig. 5 is a sectional elevation of Fig. 4 taken on the lines 5—5;

Figure 7:
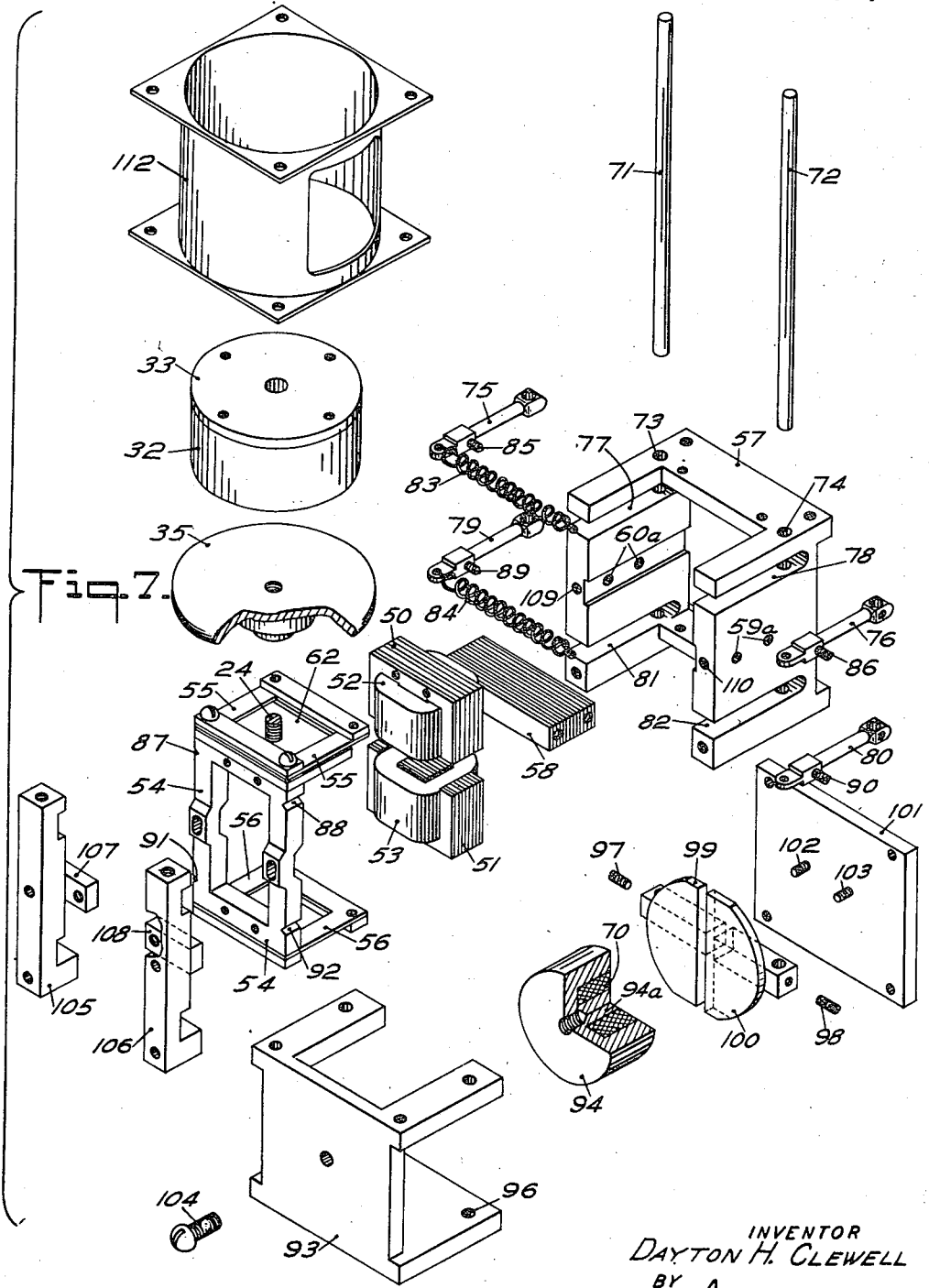

Fig. 6 of Sheet 1 is a sectional elevation taken on the lines 6—6 of Fig. 4; and Fig. 7 is an exploded perspective view of the principal parts of the geophone of Figs. 4–6.

Referring to the drawings, the invention in one form has been shown in Fig. 1 as applied to a geophone mounted within an enclosing housing 11 and including a supporting frame 12 which rests upon a conical support 13 extending upwardly from the bottom of the housing 11. The housing 11 in operating position is firmly seated against the earth 14 or firmly held in a bore hole. Whenever seismic waves arrive at the geophone they cause vertical movement of the housing 11 which is transmitted through the conical element 13 to the frame 12. In the form of geophone illustrated, a laminated magnetizable member 15 rigidly supported from the frame 12 by arms 16 and 17 moves in a vertical direction alternately to increase and decrease the air gaps between a pair of U-shaped permanent magnets 18 and 19.

These magnets, together with a spacing and supporting yoke 20, form a part of an inertia mass supported by leaf springs 21 and 22 which extend outwardly from the housing as cantilevers. A rod 24 threaded at its lower end is rigidly secured to the yoke 20, while its upper end is provided with an opening to receive the lower end of a gravity spring 25. The upper end of the gravity spring 25 is carried in an opening provided in an adjusting screw 26. By means of a threaded adjusting nut 27, which may be knurled and which may carry graduations 28, the screw 26 may be moved in a vertical direction to adjust the tension of the spring 25 which acts to support the inertia mass against the pull of gravity. The lock nut 29 is provided to lock the adjusting nut 27 in any desired position. Normally, the geophone is adjusted so that the leaf springs 21 and 22 extend horizontally from and at right angles to the frame 12 with the magnetizable member 15 disposed intermediate the air gaps between the poles of the U-shaped permanent magnets 18 and 19.

The vertical movement of the frame 12, in manner well understood by those skilled in the art, changes the flux passing through the member 15 and thus introduces an electromotive force between the ends of a coil 30 disposed in encircling relation around the magnetizable member 15. As shown, this member is laminated. In this form of the invention it is desirable that it be made of a material of high permeability, such as a good grade of transformer steel.

The leaf springs 21 and 22 and the gravity spring 25 impart to the suspension system an elastic stiffness K. The natural undamped frequency of the system for vertical vibration may be expressed by the equation:

$$n = \frac{1}{2\pi}\sqrt{\frac{K}{M}}$$

where K is the total stiffness to vertical deflection and M is the mass of the suspension system. By adding a negative stiffness factor to reduce the value of K, the natural undamped frequency may be decreased. This is done by supporting from the frame 12 a permanent magnet 32, shown as of cylindrical shape, and connected to a core member 33 of magnetizable material, preferably of high permeability.

Though a symmetrical arrangement of bar magnets around the core 33 may be utilized, the preferred form of the invention is a circular permanent magnet 32 which encircles in symmetrical relation the axis of the suspension system. The permanent magnet or magnets applies or produces an attractive effort upon an armature 35 which is symmetrical around the axis of the suspension system and may consist of a circular plate of magnetizable material having a threaded hub engaging the threaded end of the screw 24. If the armature 35, suspended below magnet 32, be rotated with reference to the rod 24 in a direction to decrease the air space between it and the magnet 32, it will be understood that the attractive effort, exerted in a weight-supporting direction and tending to move the inertia mass in an upward direction, will be increased. If the air gap be increased, the attractive effort will be decreased.

If now it be assumed that the armature 35 is secured in a fixed position as by a set screw 36 and the frame 12 is moved vertically by seismic waves, upward movement will decrease the attractive effort while downward movement of the frame 12 will increase it. However, the upward movement increases the force exerted by spring 25 while downward movement of frame 12 decreases the force of spring 25. In both cases, the result of the addition of magnet 32 and armature 35 is the addition of a force or factor which assists in producing relative movement between the inertia mass and the frame. Accordingly, negative stiffness or negative compliance is added to the suspension system, and K, the total stiffness, then becomes equal to:

$$K = k - k'$$

where k equals the elastic stiffness due to the leaf springs and the gravity springs and k', of negative sign, is equal to:

$$k' = \frac{2H o^2 A}{h}$$

where Ho is the flux density in the gap of length h, between the permanent magnet 32 and the armature 35, and A is the area of the total gap face. As already noted, a change in the magnitude of the spring force due to movement of frame 12 is accompanied by a change of the magnitude of the magnetic force in the opposite direction.

Inasmuch as relative movement between the armature 35 and the magnet 32 changes the magnetic flux in the magnetic circuit, it has been found desirable to include therein a coil 37, the ends of which are connected in a series circuit including a variable resistor 38. By adjusting the value of the resistance of the resistor 38, the damping of the suspension system may be varied as desired, usually to a point where there is critical damping of the suspension system.

Though geophones are generally adjusted at the factory, it is sometimes, and frequently, necessary to make field adjustments to insure that each geophone has its permanent magnets or field elements in proper or symmetrical relation with the relatively stationary core member 15. Further in accordance with the present invention, such adjustments may be made from positions remote from the geophone itself, as by the provision of a coil 40, preferably symmetrically disposed around the axis of the suspension system. As shown in Fig. 1, it is provided in an annular space provided in the core 33. Conductors 41 and 42 lead from the coil 40 to a source of direct current, such as a battery 43. The energization of the coil 40 is under the control of a potentiometer 44 connected across the source of direct current. By varying the position of the top 44a, coil 40 will exert any desired attractive effort and will produce physical movement of the inertia mass to provide the desired initial adjustment of the geophone as well as to add a small amount of negative stiffness to the system.

In accordance with the system of Fig. 3, the coil 37 is made to perform both the functions of coils 37 and 40 of Fig. 1. This is accomplished by providing a resistor 45 of relatively high resistance between the damping resistor 38 and the potentiometer 44. Thus, as far as the coil 37 is concerned, the resistor 38 forms a relatively low resistance path for the flow of damping current. On the other hand, the contact or tap 44a may be adjusted with respect to the resistor 44 to produce current flow through the resistor 45 and the coil 37 for initial adjustments of the geophone. In this manner, the single coil 37 not only performs the functions of coils 37 and 40 of Fig. 1, but there is also provided control of the two functions which are relatively independent of each other.

In the preferred form of the geophone as shown in Figs. 4-7, the permanent-magnet type of vibration-responsive means of Figs. 1-2 may be utilized, or a vibration-responsive arrangement of the form fully disclosed in Minton Patent 2,371,973 may be provided. The latter form of responsive means has been illustrated in Figs. 4-7 and comprises two E-shaped cores 50 and 51 provided with coils 52 and 53 about the central legs thereof. The cores 50 and 51 are secured to a supporting frame 54 which is carried by leaf springs 55 and 56. These leaf springs extend as cantlievers from a frame 57. A laminated core 58 is held in fixed position by bolts 59 and 60 extending through openings 59a and 60a of the frame 57.

Referring to Figs. 4 and 5, the suspension system is provided with a gravity spring 25 adjustable by means of a nut 27 and a threaded rod 26 in a manner already described in connection with the geophone of Figs. 1 and 2. The lower end of the gravity spring 25 is secured to a threaded rod 24 which in this case has its lower end rigidly secured as by welding to a plate 62 which extends outwardly from the frame 54 and in spaced relation with the leaf spring 55. This arrangement provides a simple means of locating the rod 24 so that the axis thereof passes through the center of gravity of the mass, including the magnetizable cores 50 and 51. As in Figs. 1 and 2, a circular armature 35 is threadedly carried by the rod 24 in cooperative relation with a cylindrical permanent magnet 32 to which is secured, as by brazing, a core 33. In the space between the permanent magnet 32 and the central portion of the core 33 there are disposed a damping coil 63 and a position-adjusting coil 64. The damping coil 63 comprises a single turn of copper of substantial cross section and low resistance. The position-adjusting coil 64 is preferably energized in a circuit corresponding with that of Fig. 1, although if desired the system of Fig. 3 may be utilized to provide additional damping and control thereof over a limited range.

The housing 11 is shown in full in Figs. 4 and 5 and it will be observed that it is provided with a closure member 65 and a threaded extension 66 having at its upper end a carrying loop or handle 67. A cable 68 extends through a stuffing gland 69 and is provided with the requisite number of conductors to provide connections to the coils 64, 52 and 53 as well as to the operating coil 70 of a clamping device now to be described.

A clamping device of some kind is generally desirable for sensitive geophones, particularly when they must be transported by trucks over rough roads. In accordance with the present invention, the geophone is not only protected against shocks in transit but also against accidental mechanical shocks which may result from the handling of the geophone, or shocks which might result by a field man accidentally stubbing his toe or striking his foot against a geophone. To safeguard against all accidents of this character, the clamping device is designed rigidly to hold the inertia mass in fixed position except during the relatively short periods during which signals are to be received by the geophone. To this end the clamping device is normally effective and it is arranged to release the inertia mass only upon energization of the clamping-operating coil 70. Thus, each coil 70 of each geophone may be energized from the recording truck just prior to the time when signals are to be received and recorded.

The essential elements of the clamping device comprise two rods 71 and 72 rotatably mounted in openings 73 and 74 of the frame 57. Two upper arms 75 and 76 are fastened to the rods and extend outwardly therefrom in the slots 77 and 78 provided in frame 57. Similarly, two lower clamping arms 79 and 80 are secured for movement through the slots 81 and 82 in the lower part of the frame 57. A spring 83 interconnects the free ends of arms 75 and 76 while a spring 84 interconnects the free ends of arms 79 and 80. The arms 75 and 76 carry pointed screws 85 and 86 which are movable by the spring 83 into V-shaped notches 87 and 88 provided in the spring-mounted frame 54. Similar pointed screws 89 and 90 of the lower arms cooperate with similar V-notches 91 and 92 of the frame 54. The rods 71 and 72 extend downwardly through a sub-frame 93 which is bolted to frame 57 and which supports the operating coil 70 and its encircling core 94.

As best shown in Fig. 7, this core is cylindrical in shape with a central extension 94a, which passes through the center of coil 70. The rods 71 and 72 have their lower ends journaled in openings in the sub-frame 93, such as the openings 95 and 96 shown for the rod 72. To the lower end of each of the rods 71 and 72 there is attached as by set screws 97 and 98 armature members 99 and 100. Each armature member is of semicircular shape, the two of them presenting a circular area somewhat greater in diameter than the core of the coil 70. Upon energization of the coil 70, both armature members 99 and 100 are attracted to and moved by the operating magnet to positions in engagement therewith and against the bias of the springs 83 and 84. As a result, the rods 71 and 72 are rotated in opposite directions to move the arms 76 and 80 in a counter-clockwise direction to move their projections 86 and 90 out of engagement with the V-notches 88 and 92 while the arms 75 and 79 are rotated in a clockwise direction, as viewed in Fig. 7, to move the projections 85 and 89 out of engagement with the grooves 87 and 91. Thus so long as the coil 70 is energized, the suspension system is released from the clamping device while upon de-energization of the coil 70 the inertia mass is firmly clamped in fixed position to prevent damage to the leaf springs 55 and 56 due to mechanical shocks or excessive vibration.

It is believed the other mechanical features of the assembly will be self-evident from the drawings. For example, a plate 101 is secured to the sub-frame 93 and is provided with adjusting screws 102 and 103 to limit the movement of the armature members 99 and 100 under the bias of the springs 83 and 84. The magnet core 94 is secured to the sub-assembly 93 as by the screw 104. Upstanding posts 105 and 106 extend upwardly from the sub-frame 93, inwardly extending arms 107 and 108 being provided for screws which enter openings 109 and 110 of frame 57. The upper ends of the posts have threaded openings to receive screws extending through openings of a housing and inner magnetic shield 112 which surrounds the permanent magnet 32 and its associated assembly. The housing 112 is also fastened to the frame 57 and to the closure member 65, as by screws, so that the inner assembly as a whole may be removed from the housing 11 with removal of the closure member 65.

While preferred embodiments of the invention have been described, it will be understood that further modifications may be made within the spirit and scope of the invention as set forth in the appended claims.

What is claimed is:

1. In a seismic wave detector including a frame, an inertia mass, a suspension system including spring means for directly supporting said mass from said frame, magnetic-reluctance means respectively supported from said mass and frame for producing output signals in response to seismic waves, the combination of a circular magnet supported from said frame concentrically of said suspension system, a member of magnetizable material adjustably carried by said system in magnetic attractive relationship with said magnet in a position nearer said mass than that of said magnet and acting in the same direction as said spring means for introducing a negative stiffness factor into said suspension system, a damping coil disposed within said circular magnet, resistance means in circuit with said coil for controlling the degree of damping produced thereby, and means for adjusting the position of said mass comprising means for establishing and controlling the energization of said coil to develop an attractive force on said member of desired magnitude.

2. In a seismic wave detector including a main frame, an inertia mass, a suspension system including spring means for supporting said mass from said frame, the combination of a sub-frame supporting said main frame, an electromagnet carried by said sub-frame, a pair of armatures operable by said electromagnet, rods connected to said armatures and extending upwardly and journaled in said main frame, said inertia mass having clamping recesses on opposite sides thereof, and clamping arms carried by said rods and biased into engagement with said recesses and upon energization of said electromagnet operable to free said inertia mass.

3. The combination set forth in claim 2, in which said main frame is provided with elongated openings in which said clamping arms may move into and out of engagement with said inertia mass.

4. The combination set forth in claim 2, in which said inertia mass and said main frame includes means for applying to said suspension system a negative stiffness, and in which said clamping arms render ineffective said negative-stiffness means while said electromagnet is de-energized.

5. The combination set forth in claim 2 in which said electromagnet comprises a core having a continuous outer pole piece, a central pole piece and a coil encircling said central pole piece and disposed within the space between it and said outer pole piece, and each of said armatures comprising members which from adjacent the outer portions of said outer pole pieces extend to substantially the center of said inner pole piece.

6. In a seismic wave detector including a frame, an inertia mass, spring-suspension means for supporting said inertia mass from said frame, and means operable by relative movement between said frame and said mass for producing output signals, the combination of two members relatively adjustable one with respect to the other, one of said members including a permanent magnet exerting a magnetic attractive force on the other, means supporting one of said member from said inertia mass, means supporting the other of said members from said frame in such relation to said first-named member that said attractive force is in a weight-supporting relation to said mass for introduction into said spring-suspension means of a negative stiffness factor for reduction of the natural undamped frequency thereof, a coil supported in inductive relation with the flux of said permanent magnet, variable resistance means interconnecting the ends of said coil for control of magnetic damping of said suspension means and of said mass, and means for establishing and controlling direct-current energization of said coil for adjusting the static position between said mass and said frame.

7. In a seismic wave detector including a frame, an inertia mass, spring-suspension means for supporting said inertia mass from said frame, and means operable by relative movement between said frame and said mass for producing output signals, the combination of two members relatively adjustable one with respect to the other, one of said members including a permanent magnet exerting a magnetic attractive force on the other, means supporting one of said members from said inertia mass, means supporting the other of said members from said frame in such relation to said first-named member that said attractive force is in a weight-supporting relation to said mass for introduction into said spring-suspension means of a negative stiffness factor for reduction of the natural undamped frequency thereof, a coil supported in inductive relation with the flux of said permanent magnet, variable resistance means interconnecting the ends of said coil for control of magnetic damping of said suspension means and of said mass, and means for establishing and controlling direct-current energization of said coil for adjusting the static position between said mass and said frame including an adjustable resistor of high resistance compared with that of said variable resistance means connected in series circuit relation with said coil for control of the magnitude of the direct current supplied thereto whereby either said resistor or said resistance means may be independently adjusted without material effect upon the function of the other.

DAYTON H. CLEWELL.

REFERENCES CITED

The following references are of record in the file of this patent:

UNITED STATES PATENTS

| Number | Name | Date |
|---|---|---|
| 2,067,636 | Heiland | Jan. 12, 1937 |
| 2,111,643 | Salvatori | Mar. 22, 1938 |
| 2,147,060 | Reynolds | Feb. 14, 1939 |
| 2,271,864 | Honnell et al. | Feb. 3, 1942 |
| 2,303,413 | Washburn | Dec. 1, 1942 |
| 2,307,792 | Hoover | Jan. 12, 1943 |
| 2,311,079 | Parr | Feb. 16, 1943 |
| 2,408,478 | Petty | Oct. 1, 1946 |
| 2,418,953 | Raitt | Apr. 15, 1947 |

FOREIGN PATENTS

| Number | Country | Date |
|---|---|---|
| 245,805 | Great Britain | Jan. 20, 1927 |